United States Patent [19]

Mathews

[11] 4,244,542
[45] Jan. 13, 1981

[54] CONDUIT SPACER SYSTEM

[76] Inventor: Lyle H. Mathews, 2141 Shannon Way, Mesa, Ariz. 85205

[21] Appl. No.: 45,303

[22] Filed: Jun. 4, 1978

[51] Int. Cl.³ .............................................. F16L 3/00
[52] U.S. Cl. .................................... 248/49; 138/112; 248/68 R
[58] Field of Search ................. 248/68 R, 68 CB, 49; 405/155; 138/105, 106, 112; 211/194

[56] References Cited

U.S. PATENT DOCUMENTS

| | | | |
|---|---|---|---|
| 2,577,120 | 12/1951 | Franz | 248/68 R UX |
| 2,902,821 | 9/1959 | Kelly | 248/68 R UX |
| 3,523,667 | 8/1970 | Guerrero | 248/49 |
| 3,765,629 | 10/1973 | Voelker | 138/112 X |
| 3,856,246 | 12/1974 | Sinko | 248/49 X |
| 3,964,707 | 6/1976 | Lewis | 248/68 CB X |
| 4,099,626 | 7/1978 | Magnussen | 248/68 CB X |
| 4,114,241 | 9/1978 | Bisping | 248/68 CB X |

FOREIGN PATENT DOCUMENTS 540129 4/1957 Canada ..................................... 138/112
1101196 1/1968 United Kingdom ...................... 248/49

Primary Examiner—J. Franklin Foss
Attorney, Agent, or Firm—Philip M. Hinderstein

[57] ABSTRACT

A system for supporting a plurality of conduits above another in parallel, spaced-apart relationship including a base unit for supporting the bottom conduit, the base unit comprising a base and a U-shaped member having an open end for receiving the bottom conduit and supporting same, and an intermediate unit including first and second U-shaped members, the open ends of which extend in opposite directions whereby an intermediate unit can be pushed down onto one conduit and positioned to support another conduit thereabove. By continuing this process, multiple conduits can be supported and spaced one above another. Each unit includes matching interlocking means attached to opposite sides thereof whereby adjacent units may be interconnected to support multiple columns of conduits with a desired horizontal spacing.

4 Claims, 5 Drawing Figures

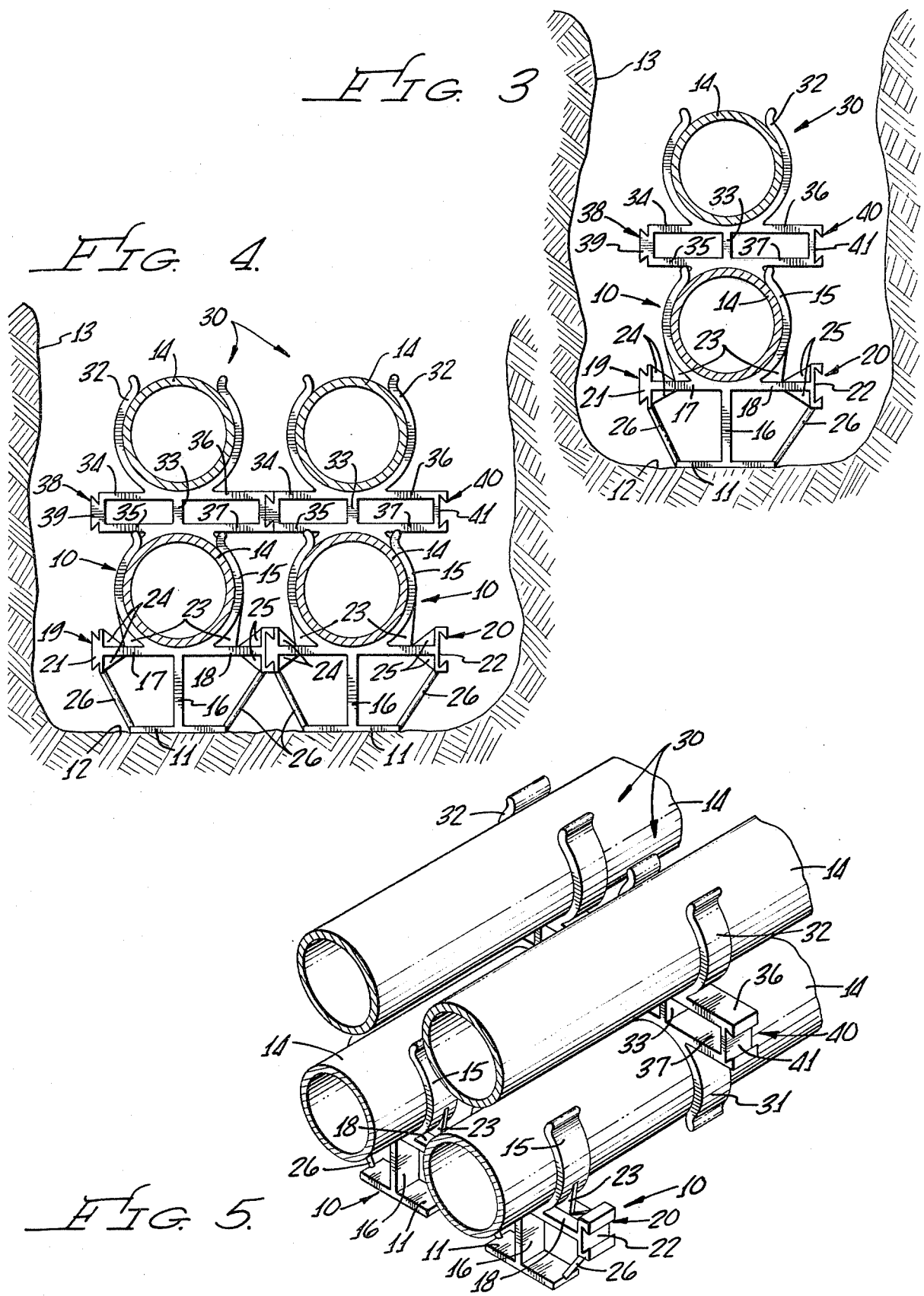

CONDUIT SPACER SYSTEM

BACKGROUND OF THE INVENTION

1. Field of the Invention

The present invention relates to a conduit spacer system and, more particularly, to a base and intermediate unit for supporting a plurality of conduits and for maintaining horizontal and vertical separation between each conduits.

2. Description of the Prior Art

In a conventional underground installation of electrical cables, the cables are run through conduits placed in a ditch and imbedded in concrete. These conduits generally are less than six inches in diameter. Utility company specifications and municipal code requirements often set forth a minimum spacing between adjacent conduits in a ditch and between each conduit and the bottom and sides of the ditch. Typical minimum spacings range from one and one-half inches to three inches. Therefore, one cannot simply place the conduits in a ditch without some means for maintaining the required separation therebetween.

In the past, base plates or spacers have been used to support electrical conduits above the floor of a ditch and/or to maintain separation between adjacent conduits. A problem encountered with base plate-type supports is that as concrete is being poured into the ditch to imbed the conduits, the force of the concrete tends to shift the position of the conduits on the base plates. Thus, to ensure that the minimum required separation will be maintained while pouring the concrete, it is often necessary to tie the conduits to the base plates. Such a tying operation is time-consuming and hence adds considerably to the cost of an underground conduit installation.

Another approach of the prior art has been to provide coupling collars at the joints between adjacent conduit sections. These coupling collars are generally square in shape, typically having a cradle at the top for receiving another conduit. Such coupling collars have significant disadvantages. For example, they can be used only at the intersection of adjacent conduit sections, thus significantly limiting their placement within a ditch. Moreover, each conduit must be placed carefully in their ditch atop the cradle of the subsequent conduit and such operation is time-consuming and adds considerably to the cost of an underground conduit installation.

In my U.S. Pat. No. 3,643,005, there is disclosed a unitary spacer for maintaining separation between electrical conduits in a ditch. Such spacer comprises a short tubular section having an inner diameter slightly larger than the outer diameter of the conduit with which the spacer is employed and an annular disc-shaped portion which extends radially outwardly from the tubular section and is provided at the periphery with a flanged rim. The rim supports the spacer-conduit assembly while the tubular section maintains the spacer perpendicular to the conduit at all times. Such a spacer readily may be slid over a conduit and positioned anywhere along the length thereof. Since the spacer is circular, minimum spacing is ensured between adjacent conduits or between the conduits and the wall or floor of the ditch, even though the conduit is not carefully placed in the ditch or shifts in position during pouring of the concrete.

While the spacer of my prior patent is a significant improvement over spacers used heretofore, users thereof often have two objections thereto. The first is that it is not convenient to stack conduits one above the other using such a unitary spacer. Secondly, the spacer must be slid over a conduit from the end thereof and this is often inconvenient when installing long conduits.

In my copending patent application Ser. No. 888,353, filed Mar. 20, 1978 and entitled Modular Conduit Spacer Rack, now U.S. Pat. No. 4,183,484, there is disclosed a conduit spacer rack comprising a plurality of units which may be interconnected to form a rack for supporting a plurality of conduits in parallel, spaced-apart relationship. Each of the units comprises four generally coplanar arms emanating from a central hub in mutually orthogonal directions, first and second adjacent arms having a predetermined width and thickness, third and fourth adjacent arms forming channels at the free ends thereof, the width and depth of the channels formed in the third and fourth arms being approximately the same as the width and thickness of the first and second arms whereby the third and fourth arms are adapted to receive the first or second arms of adjacent units. Such units may be readily assembled into a rack to stack any number of conduits, one above another.

While the modular conduit spacer rack of my copending application is also a significant improvement over spacers used heretofore, one problem prevalent with virtually all prior art spacers, including the spacer of my copending application, is that the spacer must be assembled for use with conduits. The assembly procedure is time-consuming and, with the escalating cost of labor, results in a significant labor element in the total cost of an underground conduit installation. Accordingly, the industry is presently searching for a spacer system which can be assembled very rapidly and conveniently to minimize the cost of an underground conduit installation.

SUMMARY OF THE INVENTION

In accordance with the present invention, there is provided a system for supporting a plurality of conduits above another which solves all of the problems discussed above. The present spacer system includes a pair of units which may be used to support a plurality of conduits in parallel, spaced-apart relationship with a minimum vertical and horizontal spacing between the conduits and the floor and walls of a ditch. The units of the present system are self-supporting so there is no tendency for the concrete to disassemble same when poured into a ditch. The units need not be placed at any particular position along the conduits and need not be slid on from the ends of conduits. Of greater significance, the units of the present system are extremely simple and convenient to use and an installation of any number of conduits can be done extremely simply and rapidly. Thus, use of the present system will substantially reduce the cost of an underground conduit installation.

Briefly, the present system for supporting a plurality of conduits above another in parallel, spaced-apart relationship comprises a base unit for supporting the bottom conduit comprising a base, a first U-shaped member having an open end and a diameter approximately equal to the outside diameter of a conduit to be supported thereby, and first means connecting the base to the first member with the open end of the first member extending away from the base, and an intermediate unit for supporting one conduit above another conduit comprising a second U-shaped member having an open end and a diameter approximately equal to the outside diameter of the one conduit, a third U-shaped member having an open end and a diameter approximately equal to the outside diameter of the other conduit, and second means connecting the second and third U-shaped members with the open ends thereof extending in opposite directions and the planes of the second and third members coplanar.

OBJECTS, FEATURES AND ADVANTAGES

It is therefore an object of the present invention to solve the problems resulting from time-consuming assembly procedures in the use of conduit spacers which add significant labor costs to underground conduit installations. It is a feature of the present invention to solve these problems by providing a highly simplified conduit spacer system including a base unit and an intermediate unit which are adapted to readily receive conduits for spacing same in parallel, spaced-apart relationship. An advantage to be derived is that conduits may be stacked in a ditch simply and rapidly. A further advantage is that the necessary minimum spacings between conduits is maintained. A still further advantage is that the present units are self-supporting. Another advantage is that the units may be positioned any place along the lengths of the conduits. Still another advantage is that concrete will readily flow through each unit.

Still other objects, features, and advantages of the present invention will become apparent to those skilled in the art from a reading of the following detailed description of the preferred embodiment constructed in accordance therewith, taken in conjunction with the accompanying drawings wherein like numerals designate like parts in the several figures and wherein:

BRIEF DESCRIPTION OF THE DRAWINGS

FIGS. 3 and 4 are sectional views of a ditch showing the use of the units of FIGS. 1 and 2 in stacking a plurality of conduits above another in parallel, spaced-apart relationship, FIG. 3 showing a single column of conduits and FIG. 4 showing multiple columns of conduits; and FIG. 5 is a perspective view of the conduits and spacer units assembled as in FIG. 4.

DESCRIPTION OF THE PREFERRED EMBODIMENT

Figure 1:
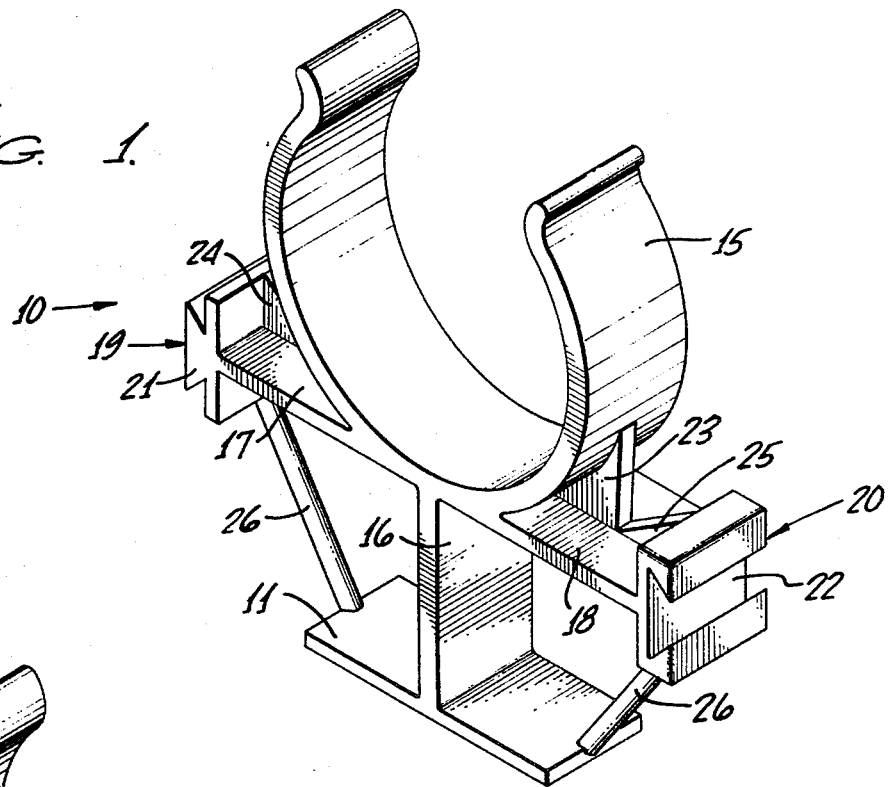
FIG. 1 is a perspective view of the base unit of the present conduit spacer system.
Figure 2:
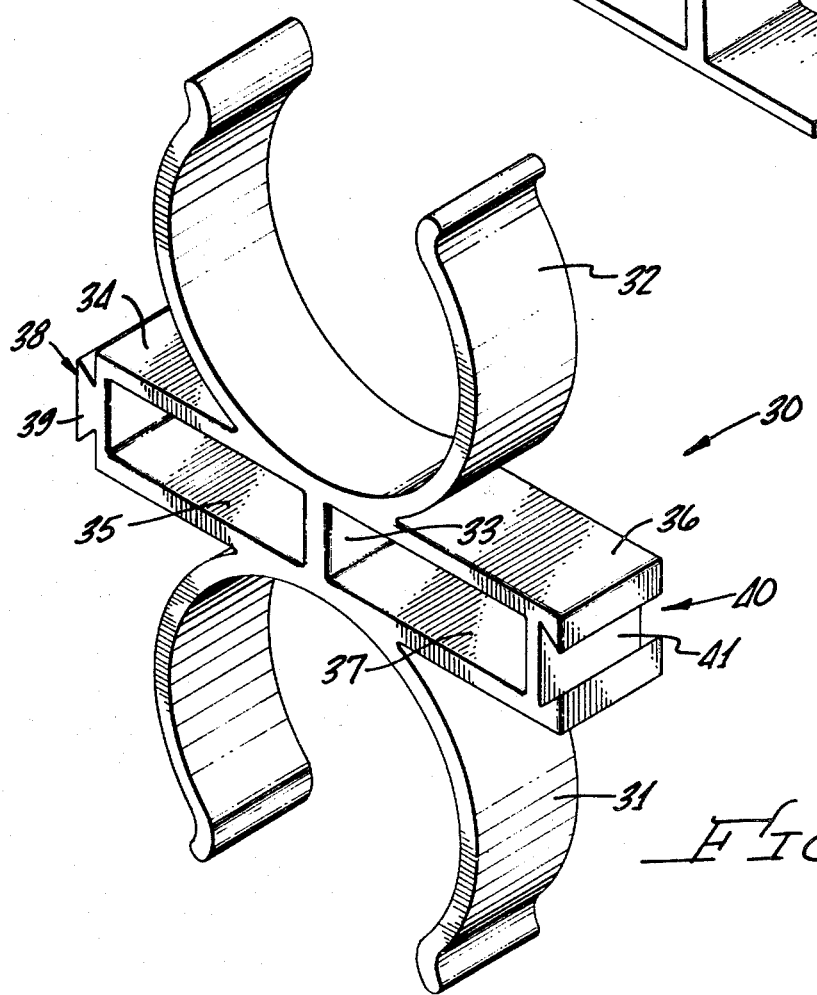
FIG. 2 is a perspective view of the intermediate unit of the present conduit spacer system.

Referring now to the drawings, there is shown a base unit, generally designated 10, and an intermediate unit, generally designated 30, units 10 and 30 comprising the present system for supporting a plurality of conduits above another in parallel, spaced-apart relationship.

More specifically, base unit 10 comprises a planar base 11 which is adapted to be positioned on the floor 12 of a ditch 13 for receipt of the bottom conduit 14 of a column of conduits 14. Base unit 10 also includes a U-shaped member 15 having an open end and an inside diameter approximately equal to the outside diameter of conduit 14 to be supported thereby. An arm 16 connected to one side of base 11 and extending perpendicular thereto is also connected to the outside surface of U-shaped member 15 thereby connecting base 11 to U-shaped member 15 with the open end of member 15 extending away from base 11. The plane of member 15 is perpendicular to the plane of base 11.

If the base unit 10 were to be used solely to support a single column of conduits 14, it could include base 11, U-shaped member 15, and arm 16 only. However, the present system is also intended to support a plurality of columns of conduits 14 in parallel, spaced-apart relationship. Therefore, in order to interlock adjacent base units and to provide for a minimum horizontal separation between adjacent conduits 14, each base unit 10 includes matching interlocking means attached to opposite sides thereof.

More specifically, base unit 10 includes a pair of arms, 17 and 18, which extend laterally from the intersection between arm 16 and U-shaped member 15, parallel to base 11. Arm 17 terminates in a tongue member 19 whereas arm 18 terminates in a groove member 20. The tongue 21 of tongue member 19 has the same general dimensions and shape as the groove 22 in groove member 20. Accordingly, and as shown in FIG. 4, multiple base units 10 may be positioned in parallel, side-by-side relationship with the tongue 21 of the tongue member 19 of one base unit 10 engaging the groove 22 of the groove member 20 of an adjacent base unit 10. This permits multiple base units 10 to be interconnected to support the bottom conduits 14 of a plurality of columns of conduits 14 with a desired spacing maintained between horizontally-spaced conduits.

All of the elements of base unit 10 just described have the same width and base unit 10 is preferably molded in one piece by an injection molding process from a resilient plastic material. This highly simplifies the manufacture of base units 10 and provides for the mass production thereof. Obviously, base unit 10 will be made with U-shaped member 15 having a diameter matching the diameter of the conduit it is to support.

In order to provide support for the various parts of base unit 10 to prevent warping thereof due to the forces placed thereupon in use, base unit 10 preferably includes a plurality of stiffening members which are made as an integral part of base unit 10 during the molding process. For example, a pair of webs 23 between member 15 and arms 17 and 18 support these members relative to each other, a pair of webs 24 between tongue member 19 and arm 17 support these members relative to each other, a pair of webs 25 between arm 18 and groove member 20 support these members relative to each other, and a pair of bars 26 between base 11 and members 19 and 20 support arms 17 and 18 relative to base 11.

Intermediate unit 30 is generally similar to base unit 10 but is designed for supporting one conduit 14 above another conduit 14 in parallel, spaced-apart relationship while maintaining a minimum separation between vertically spaced conduits. Intermediate unit 30 includes first and second U-shaped members 31 and 32, both having open ends and inside diameters approximately equal to the outside diameters of the conduits to be supported thereby. Unit 30 includes an arm 33 connected between members 31 and 32, perpendicular thereto, arm 33 supporting members 31 and 32 with the open ends thereof extending in opposite directions and with the planes of members 31 and 32 coplanar.

As was the case with base unit 10, if intermediate unit 30 were to be used solely to support a single column of conduits 14, it could consist of elements 31–33 only. On the other hand, since it is preferred to provide intermediate unit 30 with the flexibility of supporting multiple columns of conduits 14, each intermediate unit 30 includes matching interlocking means attached to opposite sides thereof whereby adjacent units 30 may be interconnected.

More specifically, intermediate unit 30 includes a first pair of parallel, vertically spaced arms 34 and 35 which extend laterally on one side of arm 33 and a second pair of parallel, vertically spaced arms 36 and 37 extending laterally on the opposite side of arm 33. Arms 34 and 35 terminate in a tongue member 38 including a tongue 39 and arms 36 and 37 terminate in a groove member 40 including a groove 41, members 38 and 40 being generally similar to members 19 and 20, respectively, of base unit 10. The dimensions and shape of tongue 39 are generally the same as the dimensions and shape of groove 41 whereby multiple units 30 may be positioned in parallel, side-by-side relationship with the tongue 39 of the tongue member 38 of one intermediate unit engaging the groove 41 of the groove member 40 of an adjacent unit 30, as shown in FIG. 4. This permits multiple units 30 to be interconnected to support the upper conduits 14 of a plurality of columns of conduits 14 with a desired spacing maintained between horizontally-spaced conduits.

As was the case with base unit 10, elements 31–41 of intermediate unit 30 all have the same width and are preferably molded in one piece by an injection molding process from a resilient plastic material. This highly simplifies the manufacture of units 30 and provides for the mass production thereof.

In operation, the primary advantage of base and intermediate units 10 and 30, respectively, is that they may be used to position a plurality of conduits 14 in a ditch 13 in parallel, spaced-apart relationship in a rapid and simple manner. Specifically, if a single column of conduits 14 is to be positioned on the floor 12 of ditch 13, as shown in FIG. 3, a plurality of base units 10 may be positioned on floor 12 of ditch 13, in parallel, spaced-apart relationship, with bases 11 resting on floor 12. A first conduit 14 is then brought into contact with the open ends of all U-shaped members 15. The ends have a spacing which is less than the outside diameter of conduit 14. However, base units 10 are made from a resilient material which permits the arms of members 15 to spread to permit entry of conduit 14 into members 15. Thus, with the simple action of pushing conduit 14 down onto the base units 10, the conduit 14 snaps into U-shaped members 15 and assembly is completed. This also locks units 10 to conduit 14.

In order to position a second conduit 14 above the bottom conduit 14, a number of intermediate units 13 have their lower U-shaped members 31 pushed down onto the bottom conduit 14. Again, the spacing between the ends of members 31 and 32 is less than the outside diameter of the conduits 14 to be used therewith, but the resiliency of the plastic material permits spreading of the arms of members 31 and 32. Therefore, it is a simple matter to push a number of intermediate units 30 down onto a previously positioned conduit 14. Thereafter, with the open ends of U-shaped members 32 of all intermediate units 30 extending upwardly, a second conduit 14 may be pushed downwardly into members 32 as described previously with regard to the insertion of the bottom conduit 14 into members 15 of base units 10.

Obviously, this procedure may be repeated whereby each conduit 14 supports a plurality of intermediate units 30, which units 30 support the next conduit 14. The result is that a plurality of conduits 14 may be assembled in a column in ditch 13 in a very rapid manner.

The procedure for assembling a plurality of columns of conduits 14 in ditch 13 is virtually identical to that described for a single column. The only difference is that adjacent base and intermediate units 10 and 30, respectively, are first interconnected before being positioned in ditch 13. Thus, as shown in FIGS. 4 and 5, for two columns of conduits 14, base units 10 are arranged in pairs before being positioned on floor 12 of ditch 13. After the bottom conduits 14 are positioned in U-shaped members 15 of both pairs of base units 10, intermediate units 30 are arranged in pairs before being brought into contact with the lower pair of conduits 14. Otherwise, the procedure is identical.

It should be obvious that one of the reasons for the speed with which base and intermediate units 10 and 30, respectively, may be installed, is the fact that they can be positioned anywhere along the lengths of conduits 14. This is shown in FIG. 5 in which it is seen that the placing of units 10 and 30 is random and according to convenience.

After units 10 and 30 and conduits 14 are positioned in ditch 13, as shown in FIGS. 3 and 4, concrete may be readily poured into ditch 13 for imbedding conduits 14. The concrete readily flows through the openings in units 10 and 30 so that there are no cracks formed. Furthermore, there is no tendency for units 10 and 30 to shift relative to conduits 14.

It can therefore be seen that according to the present invention, there is provided a system for supporting a plurality of conduits 14 above another which solves all of the problems discussed hereinbefore. The present spacer system includes a pair of units 10 and 30 which may be used to support a plurality of conduits 14 in parallel, spaced-apart relationship with a minimum horizontal and vertical spacing between conduits 14 and the floor and walls of ditch 13. Units 10 and 30 are self-supporting so there is no tendency for the concrete to disassemble same when poured into ditch 13. Units 10 and 30 need not be placed in any particular position along conduits 14 and need not be slid on from the ends thereof. Of greatest significance, units 10 and 30 of the present system are extremely simple and convenient to use and an installation of any number of conduits 14 can be done extremely simply and rapidly. Thus, use of the present system will substantially reduce the cost of an underground conduit installation.

While the invention has been described with respect to the preferred physical embodiment constructed in accordance therewith, it will be apparent to those skilled in the art that various modifications and improvements may be made without departing from the scope and spirit of the invention. For example, while members 31 and 32 of intermediate units 30 have been shown having the same diameters to support conduits 14 of the same size, it will be apparent to those skilled in the art that U-shaped members 31 and 32 of intermediate units 30 may have different diameters to support different sizes of conduits one above another. Furthermore, while a tongue and groove arrangement has been shown for the matching interlocking means of units 10 and 30, it will be apparent to those skilled in the art that other forms of interlocking connections may be used. Accordingly, it is to be understood that the invention is not to be limited by the specific illustrative embodiment, but only by the scope of the appended claims.

I claim:

1. A system for supporting a plurality of conduits above another in parallel, spaced-apart relationship comprising:
   a first unit for supporting a first conduit comprising:
      a base;
      a first U-shaped member having an open end and a diameter approximately equal to the outside diameter of a conduit to be supported thereby; and
      first means interconnecting said base and said first member with said open end of said first member extending away from said base; and
   a second unit for supporting a second conduit above said first conduit comprising:
      a second U-shaped member having an open end and a diameter approximately equal to the outside diameter of said second conduit;
      a third U-shaped member having an open end and a diameter approximately equal to the outside diameter of said first conduit; and
      second means interconnecting said second and third U-shaped members with said open ends thereof extending in opposite directions and the planes of said second and third members coplanar;
   the spacing between the open ends of said first, second and third U-shaped members being less than the outside diameters of the conduits to be supported thereby, the opposed arms of said first, second and third U-shaped members being made from a resilient material to permit spreading thereof for receipt of conduits therebetween whereby said U-shaped members may be snapped onto conduits to be supported thereby.

2. A system according to claim 1, wherein said first unit further comprises:
   first matching interlocking means attached to opposite sides of said first unit whereby adjacent first units may be interconnected.

3. A system according to claim 1 or 2, wherein said second unit further comprises:
   second matching interlocking means attached to opposite sides of said second unit whereby adjacent second units may be interconnected.

4. A system according to claim 1, 2 or 3, wherein said first unit is molded in one piece from a resilient plastic material and said second unit is molded in one piece from a resilient plastic material.

* * * * *